(12) United States Patent
Johnson et al.

(10) Patent No.: US 7,837,172 B2
(45) Date of Patent: Nov. 23, 2010

(54) ELECTRICAL FIXTURE MOUNTING ASSEMBLY

(75) Inventors: Steven J. Johnson, Galien, MI (US); Krzysztof W. Korcz, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 804 days.

(21) Appl. No.: 11/723,405

(22) Filed: Mar. 19, 2007

(65) Prior Publication Data

US 2008/0230668 A1   Sep. 25, 2008

(51) Int. Cl.
*B42F 13/00* (2006.01)
(52) U.S. Cl. .................................. 248/343; 248/906
(58) Field of Classification Search .............. 248/62, 248/63, 74.2, 200.1, 222.41, 222.51, 222.52, 248/223.21, 343, 546, 906; 174/50, 53, 57, 174/58; 220/3.9, 3.2, 3.3
See application file for complete search history.

(56) References Cited

U.S. PATENT DOCUMENTS

| | | | |
|---|---|---|---|
| 1,622,087 A | 3/1927 | Calderwood | |
| 1,754,849 A | 4/1930 | Clayton | |
| 2,321,640 A * | 6/1943 | Adkins | 220/3.8 |
| 2,732,162 A * | 1/1956 | McKinley | 248/343 |
| 4,892,211 A * | 1/1990 | Jorgensen | 220/3.2 |
| 4,909,405 A | 3/1990 | Kerr, Jr. | |
| 5,044,582 A | 9/1991 | Walters | |
| 5,150,868 A | 9/1992 | Kaden | |
| 5,272,605 A * | 12/1993 | Johnstone | 362/147 |
| 5,303,894 A | 4/1994 | Deschamps et al. | |
| 5,393,026 A | 2/1995 | Deschamps et al. | |
| 5,484,076 A | 1/1996 | Petrushka | |
| 5,624,202 A | 4/1997 | Grierson | |
| 5,720,461 A | 2/1998 | Kerr, Jr. | |
| 5,954,304 A | 9/1999 | Jorgensen | |
| 6,595,479 B2 | 7/2003 | Johnson et al. | |
| 6,761,341 B2 | 7/2004 | Pfaller | |
| 6,889,943 B2 | 5/2005 | Dinh et al. | |
| 2005/0121561 A1 * | 6/2005 | Sweigard | 248/74.2 |

* cited by examiner

*Primary Examiner*—Gwendolyn Baxter
(74) *Attorney, Agent, or Firm*—Garrett V. Davis; Mark S. Bicks; Alfred N. Goodman

(57) ABSTRACT

An electrical fixture mounting assembly is provided for quickly and easily mounting an electrical fixture to a bracket and brace assembly. The electrical fixture mounting assembly includes an electrical box, a brace assembly for attaching to a support structure and a bracket for attaching the electrical box to the brace. The brace assembly is typically and adjustable member that extends between ceiling joists located above an aperture in a ceiling. The bracket is connected to the brace by a snap fit. The bracket includes retention fingers that are resilient to snap onto the brace and prevent movement of the bracket with respect to the brace during installation of the electrical box. The bracket includes tabs with threaded apertures for receiving mounting screws. The electrical box includes circular apertures and at least one keyhole shaped slot aligned with the threaded apertures in the flanges of the bracket. At least one threaded screw is attached to the flange of the bracket which is then inserted through the keyhole shaped slot. The electrical box is then rotated slightly with respect to the bracket to temporarily secure the electrical box to the bracket and align all of the apertures in the electrical box with the threaded apertures and the bracket. The screws are then inserted through the bottom of the electrical box and tightened to secure the electrical box to the bracket. The flanges on the bracket are oriented and include cut-out portions to enable access to knockouts in the bottom wall of the electrical box.

25 Claims, 4 Drawing Sheets

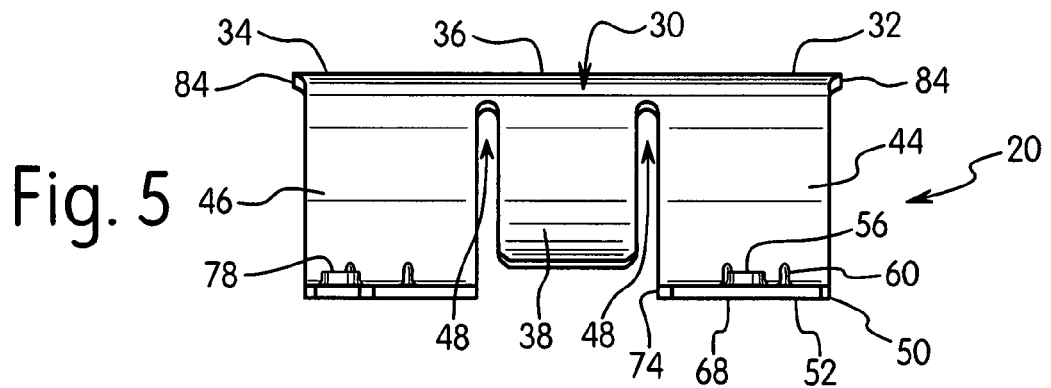
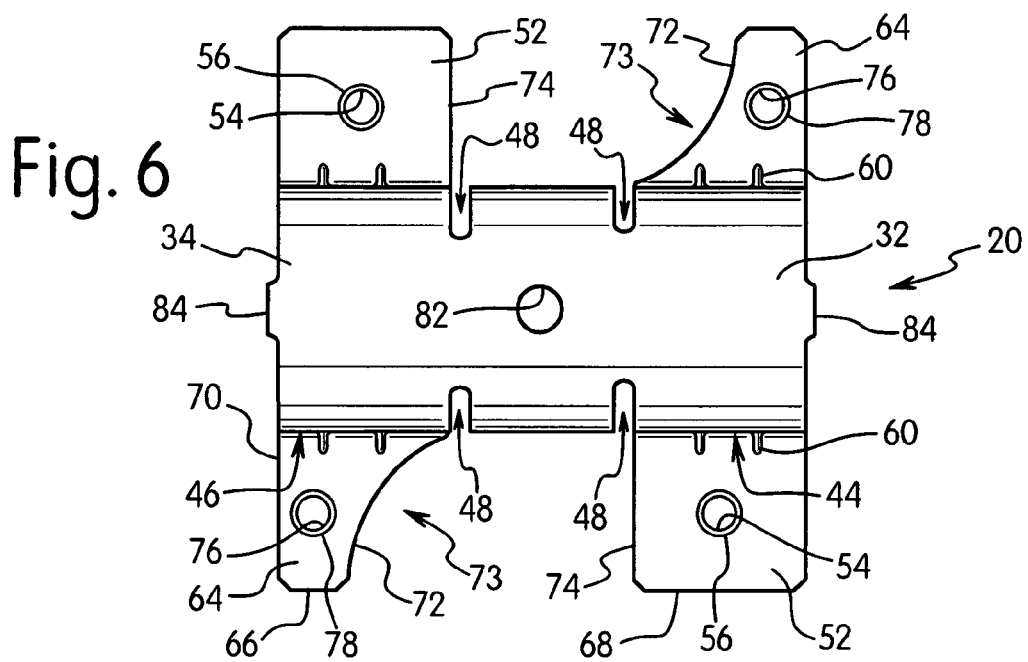
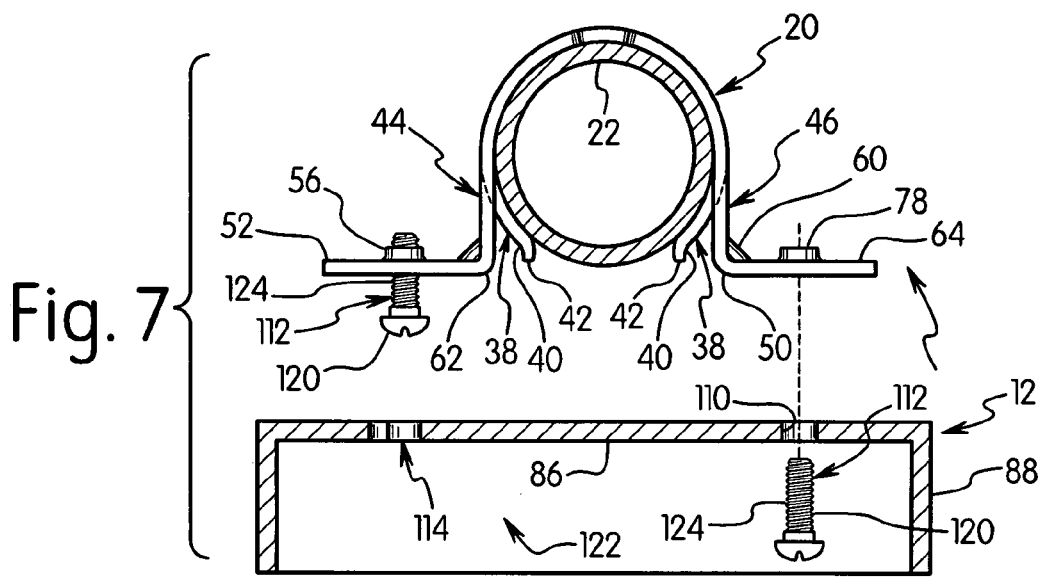

ELECTRICAL FIXTURE MOUNTING ASSEMBLY

FIELD OF THE INVENTION

The present invention is directed to an electrical fixture mounting assembly for mounting an electrical box to a support structure. More particularly, the invention relates to a mounting bracket for securing an electrical box to a brace attached to a support. The invention is particularly directed to an electrical fixture mounting assembly where the knockouts in the bottom wall of an electrical box are accessible during use and while attached to a mounting bracket and brace.

BACKGROUND OF THE INVENTION

Electrical fixture mounting assemblies are known for mounting an electrical fixture to a support such as a wall or ceiling. A commonly used support is a brace that extends between a pair of ceiling joists for mounting a fixture such as a light fixture or ceiling fan. The brace is generally designed to be inserted through an aperture in the ceiling and then mounted between parallel ceiling joists. The mounting bracket is then inserted through the aperture in the ceiling and positioned on or attached to the brace. An electrical box is then inserted into a ceiling and attached to the brace and bracket by suitable fasteners.

The disadvantage of typical electrical fixture mounting assemblies is that the bracket is not securely attached to the brace so that the bracket can move or separate from the brace during installation of the electrical box. Bringing the electrical box into contact with the brace can separate the bracket from the brace or move the bracket to a position off center with the aperture in the ceiling thereby preventing proper mounting of the electrical box.

Another disadvantage of existing electrical fixture mounting assemblies is the difficulty of aligning and securing the electrical box to the bracket. The mounting assembly is generally inserted through a small aperture in the ceiling so that the workspace is severely limited. The installer relies more on a sense of touch than sight to properly align the electrical box with the bracket. Many of the existing mounting assemblies do not enable proper alignment of the electrical box with the bracket for convenient installation and attachment of the electrical box. The mounting bracket can be easily moved out of proper alignment so that the electrical box cannot be connected to the bracket. These problems make installing an electrical fixture mounting assembly in a ceiling a time-consuming and difficult process.

Another disadvantage of the existing mounting assemblies is that the bracket when attached to the electrical box overlies or obstructs the knockouts or access openings in the bottom wall of the electrical box. This limits the ability of the installer to attach the electrical wiring to the electrical box through the bottom of the electrical box.

One example of a mounting assembly for ceiling fixtures is disclosed in U.S. Pat. No. 6,595,497 to Johnson et al, which is hereby incorporated by reference in its entirety. The mounting assembly includes an expandable brace having an outer cylindrical tube and a threaded inner rod so that rotation of the tube with respect to the rod expand or contract the brace in a linear direction. A mounting bracket having a pair of dimples is attached to the brace to hold the bracket in position while the electrical box is being attached to the bracket.

Other examples of electrical fixture mounting assemblies are disclosed in U.S. Pat. No. 6,889,943 to Dinh et al., U.S. Pat. No. 5,393,026 to Deschamps et al., U.S. Pat. No. 5,954,304 to Jorgensen, U.S. Pat. No. 1,754,849 to Clayton and U.S. Pat. No. 1,622,087 to Calderwood.

The above noted mounting assemblies are generally suitable for their intended purpose. However, there is a continuing need in the industry for improved electrical fixture mounting assemblies.

SUMMARY OF THE INVENTION

The present invention is directed to an electrical fixture mounting assembly including a brace and a bracket that can be removably attached to the brace. Accordingly, a primary aspect of the invention is to provide an electrical fixture mounting assembly that can be assembled quickly and easily by the installer.

An aspect of the invention is to provide a mounting assembly for attaching to a ceiling. The mounting assembly includes a brace for attaching to a ceiling and a bracket attachable to the brace. The bracket is removably coupled to the brace to resist excessive movement during assembly of the electrical box to the brace.

Another aspect of the invention is to provide an electrical fixture mounting assembly having a mounting bracket with retention fingers for attaching to a brace to resist movement of the bracket with respect to the brace during installation of the electrical box to the bracket.

A further aspect of the invention is to provide an electrical fixture mounting assembly having a bracket with a plurality of threaded holes for receiving a mounting screw and an electrical box with a bottom wall having at least one keyhole shaped slot for receiving the screws in the bracket. The bracket is attached to the brace and the electrical box is positioned to enable the heads of the screws to pass through the keyhole slots. The electrical box is rotated to temporarily attach the box to the bracket so that the screws can be tightened to secure the box to the bracket.

The foregoing aspects of the invention are basically attained by providing a bracket for an electrical box mounting assembly, comprising a body and having first and second ends, said first end having a first U-shaped portion and a second end having a second U-shaped portion for receiving a brace; and a pair of elongated retention fingers extending from said body, said fingers being spaced apart a distance for gripping and retaining the brace.

The various aspects of the invention are also obtained by providing an electrical fixture mounting assembly comprising an electrical box having an upper wall, said upper wall having at least one knockout, and a plurality of holes for receiving threaded mounting screws; a brace; a bracket having a substantially U-shaped body for receiving said brace, a first and second flange extending outwardly from a first side of said body, and a first and second flange extending outwardly from a second side of said body, said flanges having a threaded hole for receiving a threaded mounting screws for attaching said bracket to said upper wall of said electrical box, and where said first flanges have a cut-out recessed portion to enable access to said at least one knockout when said bracket is attached to said electrical box; and a plurality of threaded screws extending through said holes in said upper wall of said electrical box and coupled to a threaded hole in a respective flange.

The aspects of the invention are also attained by providing a method of assembling an electrical fixture mounting assembly, comprising the steps of attaching at least one first threaded screw to a threaded hole of a bracket, the bracket having a substantially U-shaped body receiving a brace, a plurality of flanges having a threaded hole for receiving threaded mounting screws, and where at least one of said flanges has a cut-out recessed portion; providing an electrical box having an upper wall with at least one knockout, at least one hole for receiving a threaded screw, and at least one keyhole shaped opening; inserting said at least one first threaded screw through said keyhole shaped opening, and rotating said electrical box with respect to said bracket to attach said bracket to said electrical box; inserting at least one second threaded screw through a hole in said electrical box and threading said second screw into a threaded hole in said bracket; and tightening said first screw to attach said bracket to said electrical box.

Other aspects, advantages and salient features of the invention will become apparent from the following detailed description which taken in conjunction with the indexed drawings disclose preferred embodiments of the invention.

BRIEF DESCRIPTION OF THE DRAWINGS

Referring to the drawings which form a part of this original disclosure in which:

FIG. 5 is a side elevational view of the mounting bracket of the embodiment of FIG. 1;

FIG. 6 is a top plan view of the mounting bracket of the embodiment of FIG. 1;

FIG. 7 is a cross-sectional side view of the brace, electrical box and mounting bracket.

DETAILED DESCRIPTION OF THE INVENTION

Figure 1:
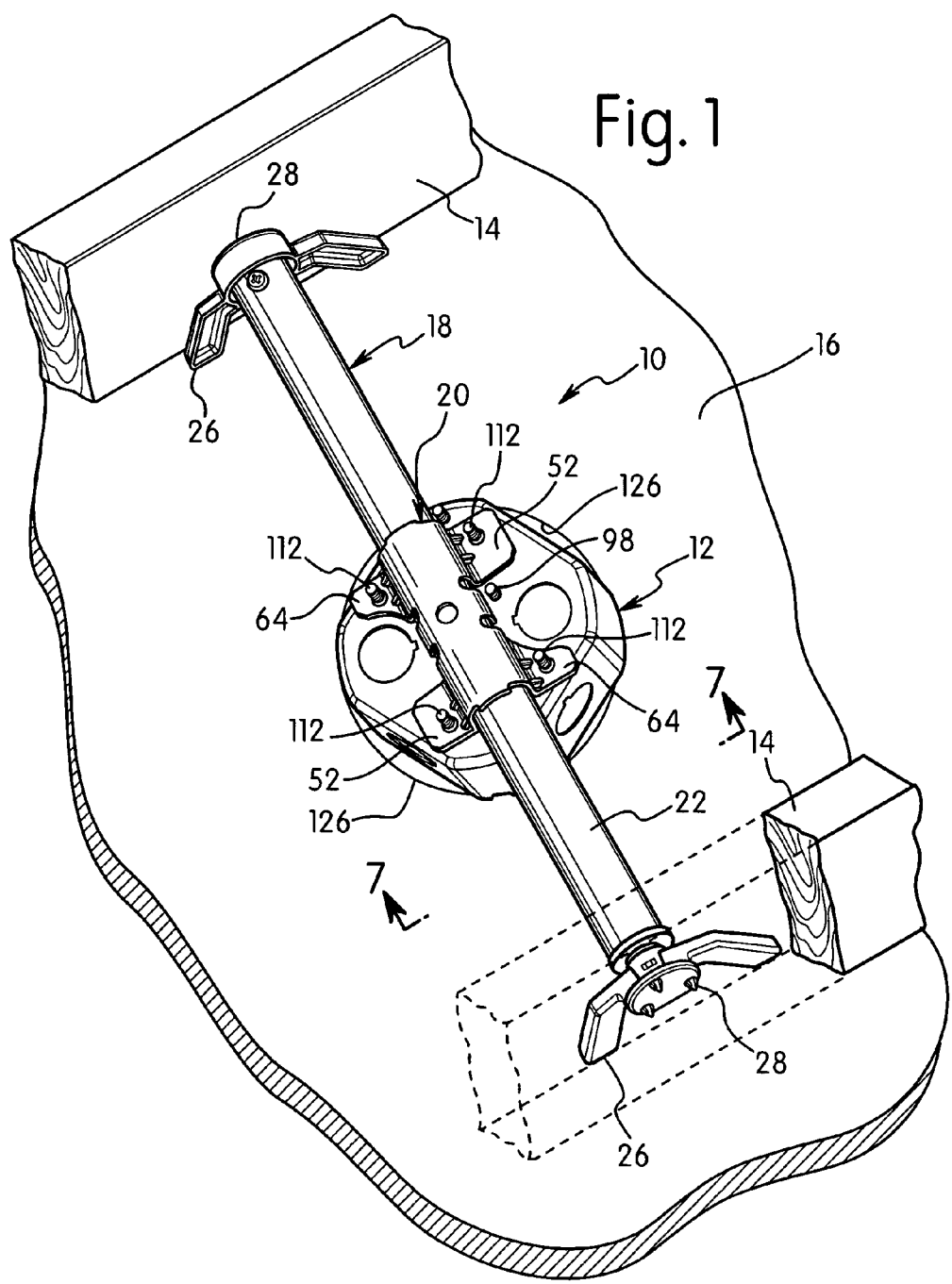
FIG. 1 is a perspective view of the electrical fixture mounting assembly in one embodiment of the invention.

The present invention is directed to an electrical fixture mounting assembly for mounting an electrical box 12 to a support structure such as a wall or ceiling. In particular, the invention is directed to an electrical fixture mounting assembly for supporting an electrical box 12 between a pair of ceiling joists 14 which are supporting a ceiling 16.

Referring to the drawings, the electrical fixture mounting assembly 10 includes a brace 18 and a bracket 20 for attaching to electrical box 12. The bracket 20 attaches to mounting electrical box 12 for coupling electrical box 12 to the brace 18. Bracket 20 is attached to brace 18 and is movable along an axial length of brace 18 to adjust the portion of electrical box 12 with respect to the longitudinal dimension of brace 18 and the angle of the electrical box 12 with respect to the brace and the surface of the ceiling.

Figure 2:
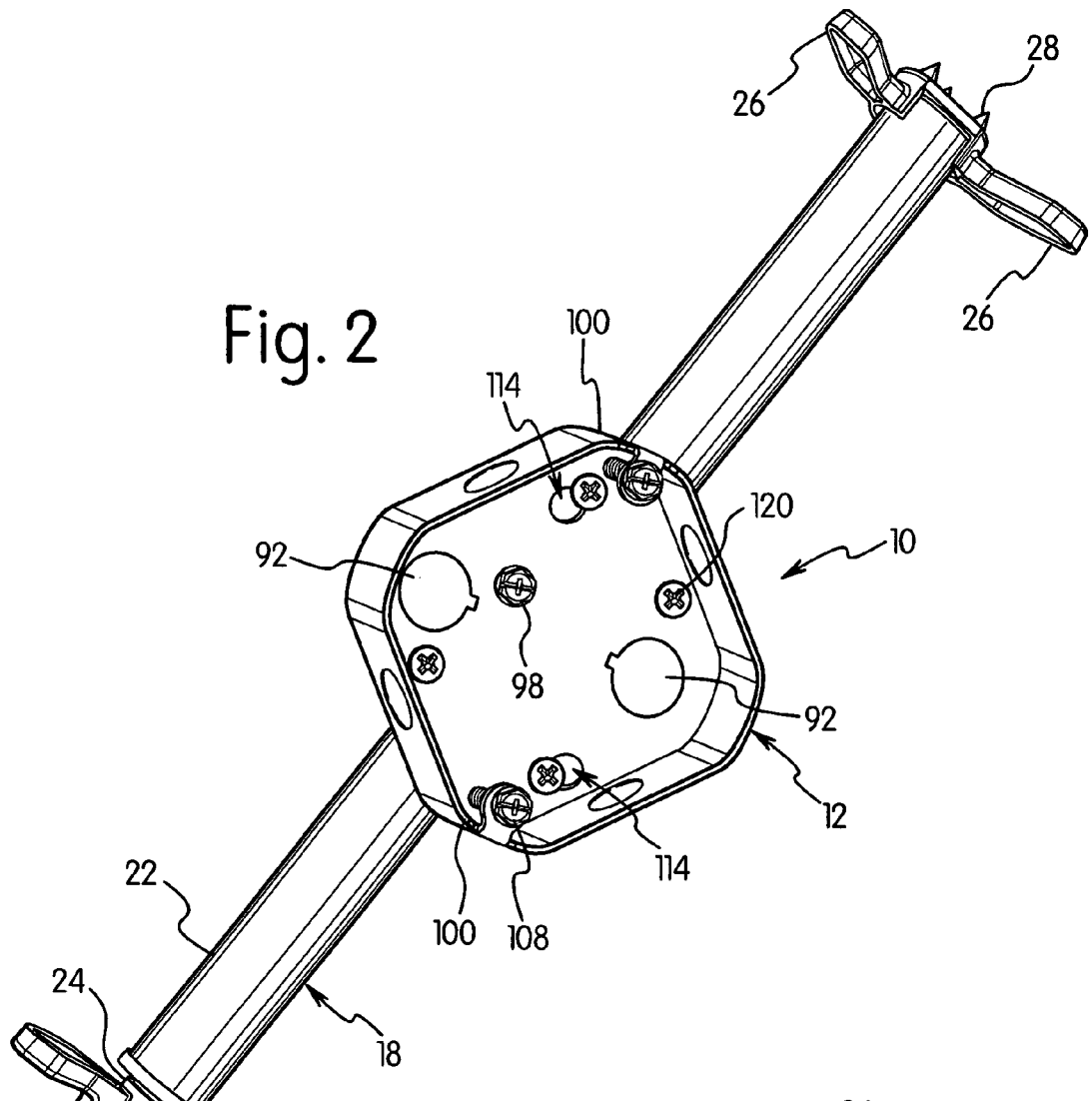
FIG. 2 is a bottom perspective view of the electrical fixture mounting assembly of FIG. 1.

Referring to FIGS. 1 and 2, brace 18 is an adjustable assembly that is positioned above the ceiling 16 between adjacent ceiling joists 14 to support electrical box 12. Brace 18 has a substantially cylindrical body 22 with internal threads and an externally threaded rod 24. Rod 24 is rotated with respect to cylindrical body 22 to expand or contract the axial length of brace 18 so that the ends of the brace contact the joists 14. The ends of brace 18 include legs 26 for supporting body 22 from ceiling 16 a selected distance. Preferably, legs 26 have a length to complement the dimensions of electrical box 12 and the ceiling thickness so that electrical box 12 is properly positioned with respect to the outer surface of ceiling 16. Typically the edge of the electrical box is positioned flush with respect to the outer surface of the ceiling. The ends of brace 18 also include prongs 28 to penetrate the ceiling joist 14 and secure brace 18 in position when the brace is expanded. One example of a brace suitable for use in the present invention is disclosed in U.S. Pat. No. 4,463,923 the disclosure of which is hereby incorporated by reference in its entirety. In one preferred embodiment, body 22 and rod 24 have a substantially tubular shape. Brace 18 is expanded by rotating rod 24 with respect to body 22 until the prongs engage and are embedded in the ceiling joist. As shown in FIGS. 1 and 2, the legs 26 define a substantially U-shaped portion to stabilize the brace during installation by resting on the inner surface of the ceiling.

Referring to FIGS. 5-7, bracket 20 has a body portion 30 with a first end 32 and a second end 34. Body portion 30 has a substantially U-shape to fit over brace 18. A middle section 36 between first end 32 and second end 34 includes a pair of retaining fingers 38. Retaining fingers 38 have a substantially curved shape and converge inwardly to define a substantially circular shaped recess as shown in FIG. 7 for receiving and gripping the cylindrical body 22 of brace 18. As shown retaining fingers have a concave inner surface and a convex outer surface. Retaining fingers 38 have an outer end 40 with a tab 42 directed slightly outwardly to assist in sliding over brace 18 during assembly. The retaining fingers 38 are sufficiently resilient to be able to snap over the brace 18 and grip brace 18 with sufficient force to retain bracket 20 on brace 18 in a selected location. The retaining fingers 38 grip the brace 18 to reduce the likelihood of bracket 20 sliding or rotating on brace 18, while attaching the electrical box to the bracket and brace while allowing some adjustment to the bracket.

First end 32 and second end 34 of bracket 20 each include legs 44 and 46. As shown in FIG. 7, legs 44 and 46 extend from body portion 30 and are substantially parallel to each other. Bracket 20 has a substantially U shape defined by the curved body portion 30 and the legs 44 and 46. In the embodiment shown, legs 44 and 46 are spaced from retaining fingers 38 and have a longitudinal length equal to or slightly greater than the ends of retaining fingers 38 and the diameter of brace 18. As shown in FIG. 6, legs 44 and 46 are spaced from retaining fingers 38 a distance to define a space 48 to prevent interference with the movement of retaining fingers 38 during the assembly of bracket 20 to brace 18.

Legs 44 have an outer end 50 with an outwardly extending flange 52. Flange 52 as shown in FIG. 6 has a substantially square configuration that extends outwardly from body 30 of bracket 20 perpendicular to leg 44 to define an L-shape with respect to leg 44. Flange 52 includes an aperture 54 and an internally threaded collar 56 for receiving a mounting screw 58. In the embodiment illustrated, ridges 60 are formed at the intersection between flange 52 and leg 44 to resist deflection and bending of flange 52 with respect to leg 44.

Legs 46 also extend downwardly from body portion 30 substantially parallel to legs 44 and the opposite side of body portion 30. Legs 46 have an outer end 62 and an outwardly extending flange 64. Preferably, flanges 52 and 64 extend outwardly in opposite directions and lie in substantially the same plane with each other as shown in FIG. 7. Flange 64 has an outer edge 66 that is preferably aligned with an outer edge 68 of flange 52. Flange 64 also includes an outer side edge 70 that is substantially straight and an inner curved side edge 72. Inner side edge 72 as shown has a substantially curved and concave shape defining a cut-out portion 73. A cut-out portion 73 of the inner side edge 72 defines an enlarged space between flange 64 and inner side edge 74 of flange 52. Flange 64 is also provided with an aperture 76 and an internally threaded collar 78 for receiving a screw 112. In the embodiment shown, a pair of ridges 60 are provided to strengthen the connection between flange 64 and leg 46 and to resist bending or deflection of flange 64 with respect to leg 46.

As shown in FIG. 6, the space between retaining fingers 38 and legs 44 and 46 define a slot 48 that enables retaining fingers 38 to flex and snap onto brace 18. An aperture 82 is provided in a central portion of body 30. Body 30 also includes tabs 84 extending outwardly from the axial ends of body 30.

Figure 3:
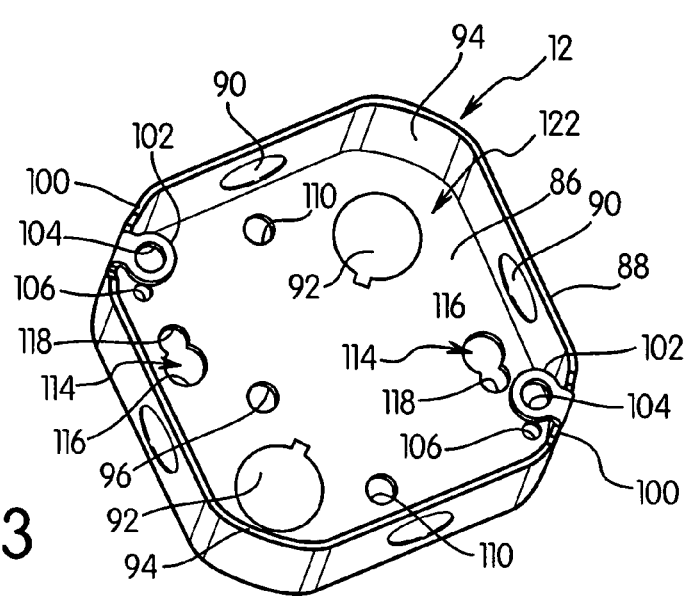
FIG. 3 is a perspective view of the open end of the electrical box of the electrical fixture mounting assembly.

Electrical box 12 in one embodiment of the invention has a substantially octangular shape as shown in FIGS. 2 and 3. In other embodiments, electrical box 12 can be square, rectangular or circular as known in the art.

In the embodiment illustrated, electrical box 12 has a base 86 which defines a bottom wall or top wall depending on the orientation of electrical box 12 during use. In embodiments of the invention, electrical box 12 is mounted in a ceiling so that base 86 defines a top wall or top end of electrical box 12. A side wall 88 extends from base in a direction substantially perpendicular to base 86. Side wall 88 includes a plurality of knockouts 90 for accessing electrical wiring. Base 86 also includes a plurality of knockouts 92. In the embodiment illustrated, knockouts 92 in base 86 are oriented in opposite corners 94 of electrical box 12. A threaded aperture 96 is provided in base 86 to receive a ground screw 98 for attaching a ground wire and to properly ground the electrical device attached to electrical box 12.

Figure 4:
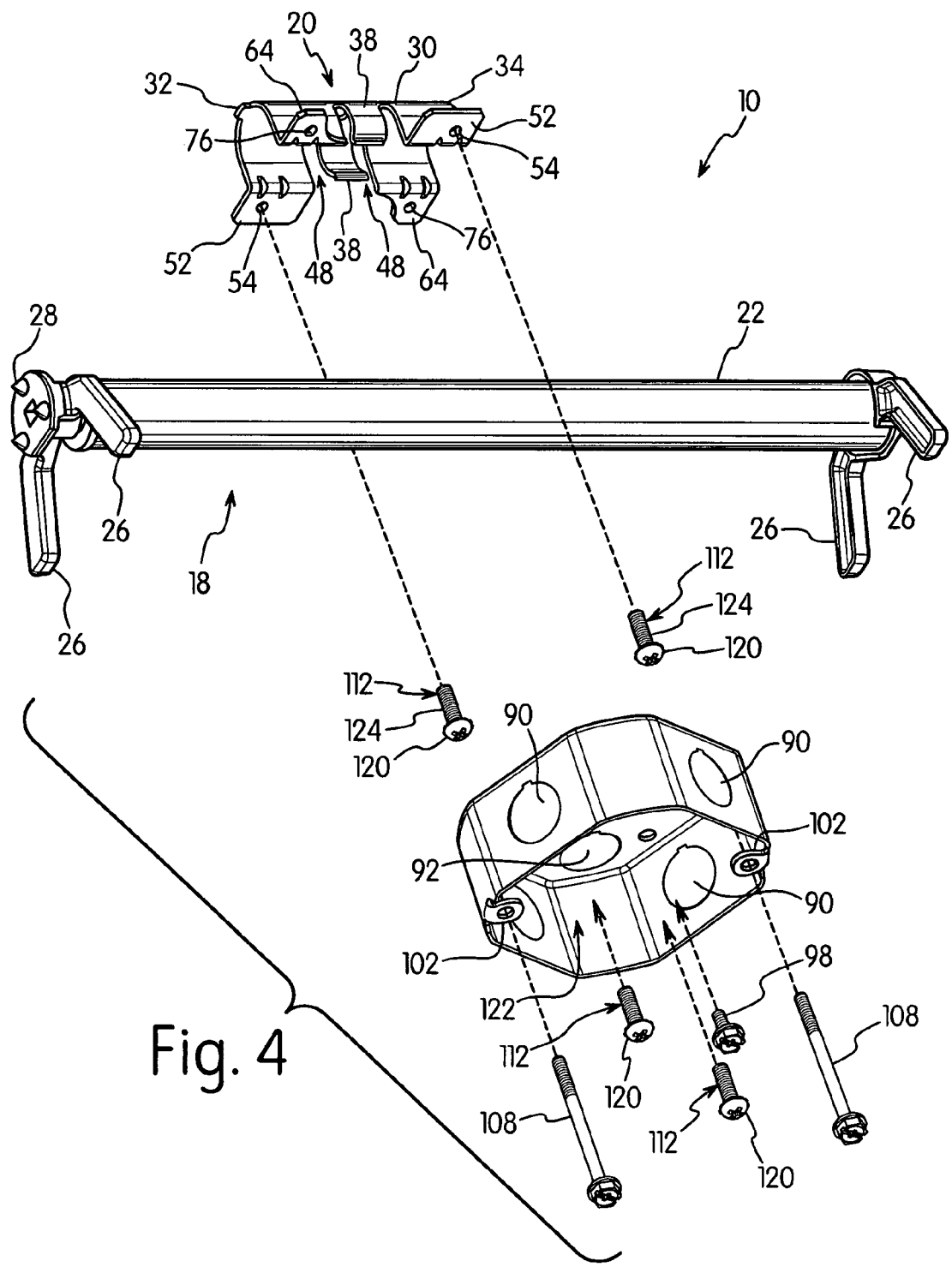
FIG. 4 is an exploded perspective view of the electrical fixture mounting assembly of FIG. 1.

Opposite corners 100 of electrical box 12 in the embodiment illustrated are provided with tabs 102 having a central aperture 104. A threaded aperture 106 is provided in base 86 and is aligned with aperture 104 in the respective tab 102. Threaded aperture 106 has an internal dimension to couple with screw 108 shown in FIG. 4. Aperture 104 in tab 102 has a dimension slightly greater than the outer dimension of screw 108 so that screw 108 passes through tab 102 and is threaded into threaded aperture 106. Tab 102 provides a stabilization mechanism for screw 108 which is used to mount an electrical device such as a ceiling fan or light fixture to electrical box 12, while resisting lateral movement of the screw 108 with respect to the base 86.

Referring to FIG. 3, base 86 includes a pair of circular shaped apertures 110 for receiving mounting screws 112. Preferably, circular apertures 110 have an inner dimension slightly greater than the outer dimension of screws 112 so that the shank of screws 112 can pass through aperture 110 and be threaded into a respective threaded aperture 54, 76 of bracket 20. Base 86 also includes at least one and preferably two keyhole-shaped slots 114. Keyhole-shaped slots 114 have a first large circular open area 116 and a smaller circular open area 118. Large circular open area 116 has a dimension sufficient to receive the head 120 of screw 112 so that the head 120 can pass through the opening into the internal cavity 122 of electrical box 12. The small circular area 118 has a dimension smaller than head 120 and slightly larger than the shank 124 of screw 112.

Circular apertures and keyhole slots 114 in base 86 of electrical box 12 are positioned to correspond to the location of the threaded apertures in bracket 20. In the embodiment illustrated, a screw 112 is partially threaded into the threaded apertures 54 of flange 52 so that the heads 120 extend downwardly. The heads 120 of screws 112 are then inserted through keyhole shape slots 114 and bracket 20 is rotated with respect to electrical box 12 to position the shank 124 of the screws in the small circular open area 118 of keyhole shape slots 114 and to align the threaded apertures 76 of flanges 64 with the circular apertures 110. The keyhole shaped slots 114 enable the temporary attachment of the electrical box to the bracket while the screws are tightened and to enable quick and easy alignment of the screw holes. Additional screws can then be inserted through the circular openings 110 from inside the electrical box 12 into threaded apertures 76.

As shown in FIGS. 1 and 2, bracket 20 is attached to electrical box 12 on the bottom side using screws 112 threaded into the threaded openings 54 and 76 of the respective keyhole shaped slot 114 and aperture 110. The bracket 20 as shown in FIG. 1 is preferably aligned with the respective screw holes in the bottom wall 86 of electrical box 12 so that bracket 18 extends diagonally across electrical box 12 between the knockouts 92. Preferably, bracket 20 is attached to electrical box 12 so that knockouts 92 are positioned between the flanges 52 and 64 without either bracket 20 or brace 18 overlying knockouts 92. The spacing between the threaded apertures of adjacent flanges can be different from the spacing between the threaded apertures on opposite sides of bracket 20 to prevent misalignment of the bracket 20 with the knockouts.

As shown in FIG. 1, the amount of available workspace in the ceiling is limited which makes it difficult for the installer to mount the electrical box and assembly in the ceiling. The installer must generally reach up through a ceiling aperture 126 from below the ceiling to install the electrical fixture and mounting assembly. The assembly of the invention enables the easy attachment of the bracket to the brace and the attachment of the electrical box to the bracket and brace.

During assembly, the electrical fixture mounting assembly 10 is inserted through the aperture 126 in the ceiling. The legs 26 of brace 18 are positioned on the upper surface of the ceiling and the brace is positioned substantially perpendicular between the ceiling joists. The body 22 and threaded rod 24 of brace 18 are adjusted by rotating threaded rod 24 with respect to brace 18 until the prongs 28 engage the opposing ceiling joist and form a secure attachment to the ceiling joist.

Bracket 20 is then inserted through the aperture 126 in the ceiling and snap fit onto body 22 of brace 18. Retaining fingers 38 of bracket 20 snap over body 22 of brace 18 to attach bracket 20 to brace 18 and resist movement of bracket 20 during installation of electrical box 12. Retaining fingers 38 slide over body 22 of brace 18 and expand outwardly to form an interference fit. The resilient nature of retaining fingers 38 enable retaining fingers to snap back to the original position and grip body 22 of brace 18. Retaining fingers 38 grip body 22 of brace 18 to resist substantial or inadvertent movement of bracket relative to brace 18. Retaining fingers 38 preferably grip body 22 to prevent bracket 20 from sliding or spinning around body 22 of brace 18.

At least one and preferably two screws 112 are partially threaded into a respective flange of bracket 20 so that the screws align with the keyhole shaped slots. In the illustrated, screws 112 are threaded in the respective flanges positioned diagonally from each other with respect to the longitudinal dimension of bracket 20 and the keyhole shaped slots. In the embodiment of FIG. 7, screws 112 are inserted into each of threaded apertures 54 of flanges 52. Alternatively, screws 112 can be inserted into threaded apertures 76 of flanges 64 depending on the position of the keyhole shaped slots 114 in electrical box 12. The screws 112 are mounted in the appropriate flanges 52, 64 so that when inserted into the keyhole shaped slot 114, the flanges are positioned adjacent the knockouts 92 as shown in FIG. 1 and the knockouts are positioned between the flanges. Preferably, the bracket 20 is mounted on electrical box 12 without the flanges overlying or covering the knockouts. One or more knockouts 92 in base 86 of electrical box 12 can be removed as needed, which are exposed between the adjacent flanges 52, 64.

Electrical box 12 is then inserted through the ceiling aperture 126 so that the heads 120 of screws 112 are inserted through the respective keyhole shaped shots 114. Electrical box 12 is then rotated slightly to position the shank 124 of screws 112 in the small circular open area 118 of the respective keyhole shaped slot 114. In this position, threaded apertures 76 of flange 66 are aligned with circular apertures 110 of electrical box 12 and electrical box 12 is attached to bracket 20 to allow the screws to be tightened. Additional screws 112 are then inserted through the base 86 of electrical box 112 and into a respective threaded aperture 76. All of the screws are then tightened to securely attach electrical box 12 to bracket 20.

As shown in FIGS. 1 and 2, the circular apertures 110 and keyhole shaped slot 114 are oriented so that electrical box 12 is substantially diagonal with respect to the longitudinal dimension of bracket 20. The dimensions of flanges 52 and 64 and the cutout portion 53 of flange 54 define a space between the adjacent flanges to expose and allow access to the respective knockouts 92 in base 86 of electrical box 12. Once electrical box 12 is secured to bracket 20 an electrical device is then attached to electrical box 12.

In the embodiment shown in the figures, the screw receiving holes and the keyhole shaped slots are arranged to that the electrical box is mounted in a diagonal position with respect to the bracket and brace. In other embodiments, the screw receiving holes can be positioned in other locations to mount the electrical box 12 in a selected position with respect to the longitudinal dimension of the bracket 20. The screw-receiving holes are also positioned with respect to the knockouts 92 in the bottom wall or base 86 of the electrical box 12 so that when the electrical box 12 is attached to the bracket 20, at least one and preferably two knockouts 92 are fully accessible through the space between the adjacent legs of the bracket 20. The space between the adjacent legs and the cutout portion preferably have a dimension to enable access to the knockout 92 in the base 86 of the electrical box 12.

Bracket 20 is preferably formed from a single sheet of metal that is stamped and folded into the final shape. Bracket 20 and particularly flanges 52 and 64 are positioned to enable attachment to electrical box 12 while allowing access to the knockouts in the base of electrical box 12. The keyhole shaped slots in the bottom wall of electrical box provide quick and easy assembly of the electrical box to the bracket.

While various embodiments have been chosen to illustrate the invention, it will be understood by those skilled in the art that various changes and modifications can be made therein without departing from the scope of the invention as defined in the appended claims.

What is claimed is:

1. A bracket for an electrical box mounting assembly, comprising:
   a body having a curved shape with a top portion having opposite side edges extending between first and second ends, said first end having a leg extending from each of said side edges of said body defining a first U-shaped portion and said second end having a leg extending from each of said side edges of said body defining a second U-shaped portion for receiving a brace, said legs on a first of said side edges have a first flange and a second flange extending from an outer end of one of said legs, each said flange having a threaded hole for receiving a threaded mounting screw for attaching said bracket to an electrical box, said first mounting flanges being spaced apart from said second flanges to define an open area therebetween, and
   a pair of elongated resilient retention fingers extending downwardly from said side edges of said top portion of said body, said fingers being spaced apart a distance for gripping and retaining the brace, said fingers being spaced from said first and second U-shaped portions to form a gap therebetween, said retention fingers being positioned between said first flanges and said second flanges.

2. The bracket of claim 1, wherein
said first flange has an inner side edge with a cut-out recessed portion to enable access to a knock out in the electrical box when the electrical box is attached to said bracket.

3. The bracket of claim 2, wherein
said first flange has an inner side edge with a cut-out recessed portion to enable access to a knockout in said electrical box and to define an open area between said first flange of said second U-shaped portion and said second flange of said first U-shaped portion.

4. The bracket of claim 3, wherein
said first flanges with said cut-out recessed portion have a width less than a width of said second flanges and where adjacent flanges define an open area therebetween to allow access to the knockout in the electrical box when the electrical box is attached to the flanges.

5. The bracket of claim 1, wherein
said retention fingers have a concave inner surface corresponding substantially to on outer dimension of the brace to grip the brace.

6. The bracket of claim 5, wherein
said retention fingers have an outer end converging toward each other to grip the brace and each of said retention fingers has a tab at the end thereof and extending outwardly from said retention fingers.

7. The bracket of claim 6, wherein
said retention fingers are spring biased to frictionally grip the brace.

8. An electrical fixture mounting assembly comprising:
an electrical box having an upper wall, said upper wall having at least one knockout, and a plurality of holes for receiving threaded mounting screws;
a brace for supporting said electrical box;
a bracket having a curved body with a top portion opposite longitudinal side edges and first and second ends, said body having a shape for receiving said brace, said side edges of said body having first and second legs at each of first and second ends, a first and second flange extending outwardly from said first and second legs at each end of said body, said flanges having a threaded hole for receiving a threaded mounting screws for attaching said bracket to said upper wall of said electrical box, and where said first flanges have a cut-out recessed portion to enable access to said at least one knockout when said bracket is attached to said electrical box and said first flanges at each end are spaced from said second flange at the opposite end to define a gap therebetween; and
a plurality of threaded screws extending through said holes in said upper wall of said electrical box and coupled to a threaded hole in a respective flange for coupling said electrical box to said bracket and brace.

9. The assembly of claim 8, wherein
said electrical box is mounted diagonally with respect to said brace.

10. The assembly of claim 8, wherein
said first and second flanges are spaced apart to define an open area to access a knockout of said electrical box.

11. The assembly of claim 10, wherein
said first flanges have a width that is less than a width of said second flanges.

12. The assembly of claim 10, further comprising:
a pair of resilient retaining fingers extending from bottom side edges of said body for snapping over and gripping said brace, each of said retaining fingers having a concave inner surface that is continuous a concave inner surface of said body.

13. The assembly of claim 12, wherein
said retaining tab fingers are spring biased to grip said brace.

14. The assembly of claim 13, wherein
said retaining fingers are integrally formed with said body portion and where said retaining fingers are positioned between said legs at said first end and said legs at said second end to define a gap therebetween.

15. The assembly of claim 10, wherein
said electrical box has two knockouts in said upper wall positioned at diagonal corners of said electrical box, and where said electrical box is coupled to said bracket so that said knockouts are positioned between said first and second flanges.

16. The assembly of claim 15, wherein
said upper wall of said electrical box includes at least one keyhole shaped opening spaced from said holes for receiving one of said screws.

17. The assembly of claim 15, wherein
said upper wall of said electrical box includes a pair of keyhole shaped openings spaced between said holes for said screws, and where said keyhole shaped openings and said holes are aligned with a threaded hole in each of said flanges.

18. The assembly of claim 8, wherein
said first flanges are spaced apart from said second flanges on said first side a distance to define a space sufficient to enable access to a first knockout in said electrical box.

19. The assembly of claim 18, wherein
said first and second flanges on said second side are spaced apart a distance to define a space sufficient to enable access to a second knockout in said electrical box.

20. The assembly of claim 8, wherein
said brace has a substantially cylindrical shape and is extendable between adjacent supports to support said electrical box and where said bracket includes a pair of retaining fingers having concave inner surfaces for gripping said brace.

21. A method of assembling an electrical fixture mounting assembly, comprising the steps of:
attaching at least one first threaded screw to a threaded hole of a bracket, the bracket having a substantially U-shaped body receiving a brace, said body having a first longitudinal side with spaced apart first and second legs and a second longitudinal side with spaced apart first and second legs, a first flange extending perpendicular to said first legs having a threaded hole for receiving the threaded screw, and a second flange extending from each of said second legs, and where said first flanges have a cut-out recessed portion;
coupling said bracket to a brace where said brace is received in said U-shaped body;
providing an electrical box having an upper wall with at least one knockout, at least one hole for receiving said threaded screw, and at least one keyhole shaped opening;
inserting said at least one first threaded screw through said keyhole shaped opening, and rotating said electrical box with respect to said bracket to attach said bracket to said electrical box;
inserting at least one second threaded screw through a hole in said electrical box and threading said second screw into a threaded hole in said bracket; and
tightening said first screw to attach said bracket to said electrical box.

22. The method of claim 21, comprising
inserting said screws into said keyhole shaped openings, and
threading third and fourth screws through said holes in said upper wall and into said threaded holes in said bracket.

23. The method of claim 22, wherein
said bracket includes a pair of resilient retaining fingers having a concave inner surface, and where said method further comprises,
attaching said brace between said retaining fingers by snapping said retaining finger over said brace.

24. An electrical fixture mounting assembly comprising:
an electrical box having an upper wall with at least one knockout and a plurality of screw holes;
a brace for coupling to a ceiling and for supporting said electrical box;
a bracket coupled to said electrical box and brace, said bracket having a body with a middle portion, a first end portion and a second end portion, said middle portion having a top wall with opposite side edges and a resilient retention finger extending downwardly from each of said side edges, said top wall and fingers having a substantially continuous semicircular shape to receive said brace;
each of said first and second end portions having two spaced apart legs, each of said legs being spaced from said fingers to form a gap therebetween; and
each of said legs having an end with a flange extending outwardly therefrom and coupled to said electrical box, said flanges being spaced apart to define a gap therebetween for accessing said knockout between said flanges.

25. The electrical fixture assembly of claim 24, wherein
each of said flanges have a collar with an internally threaded bore, and said assembly having a screw passing through a screw hole in said electrical box and said threaded bore for coupling said bracket to said electrical box.

* * * * *